Sept. 18, 1956 H. E. J. SYMES 2,763,823
PLURAL ELECTRIC MOTOR VARIABLE SPEED DRIVE
Filed July 14, 1952 3 Sheets-Sheet 1
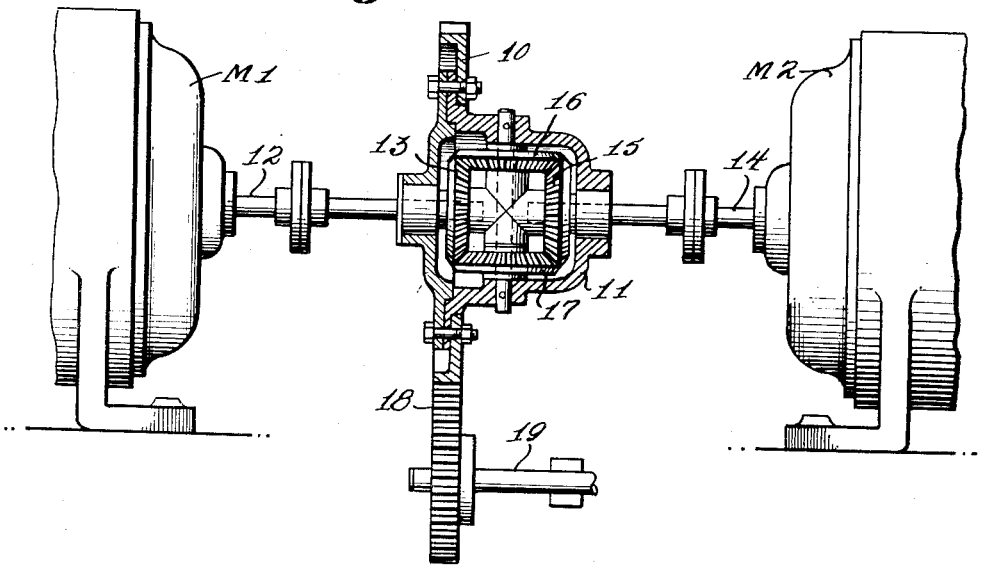
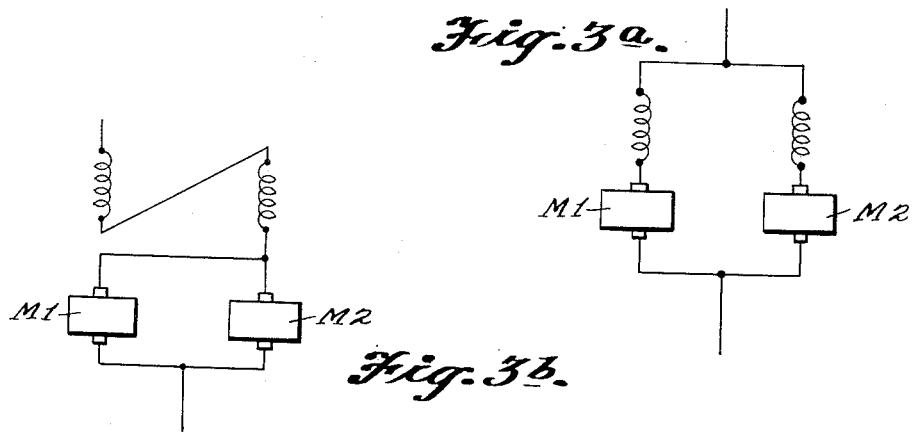
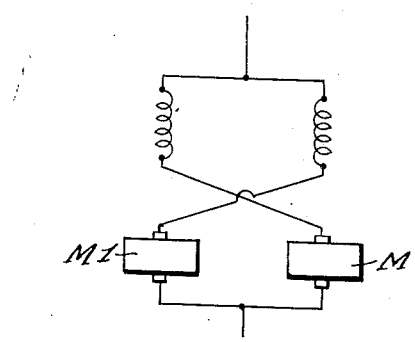
INVENTOR
HORACE E. J. SYMES
BY Young, Emery & Thompson
ATTORNEYS Sept. 18, 1956　　　　H. E. J. SYMES　　　　2,763,823
PLURAL ELECTRIC MOTOR VARIABLE SPEED DRIVE
Filed July 14, 1952　　　　　　　　　　　　　3 Sheets-Sheet 2
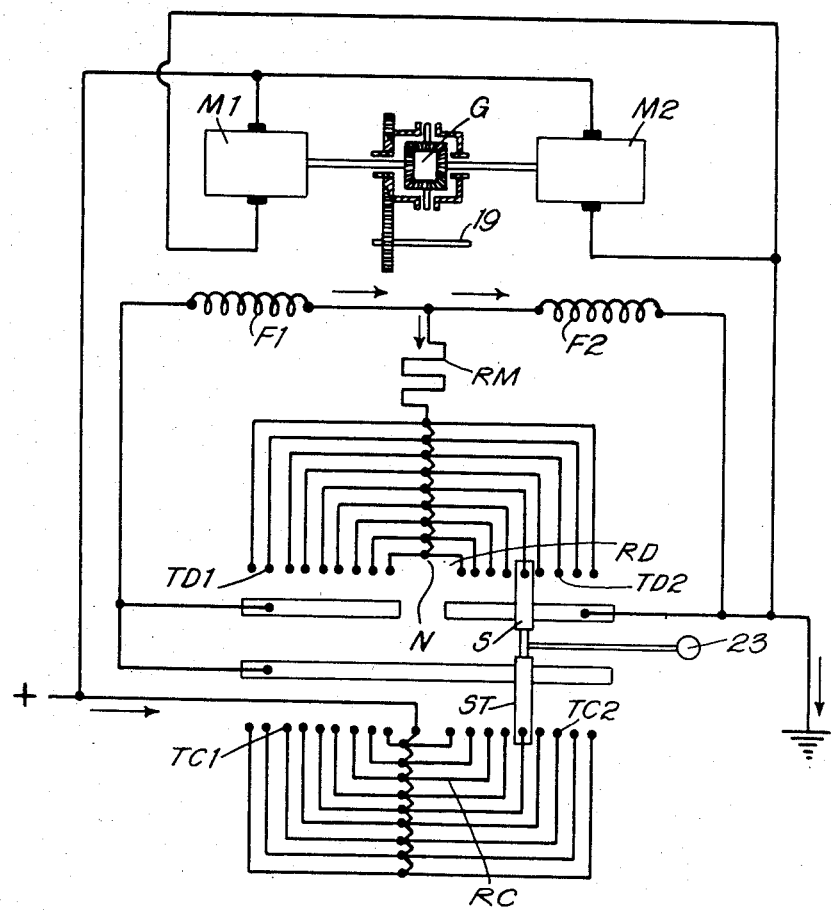
INVENTOR
HORACE EDWIN JAMES
SYMES
By Young, Emery & Thompson
ATTYS.

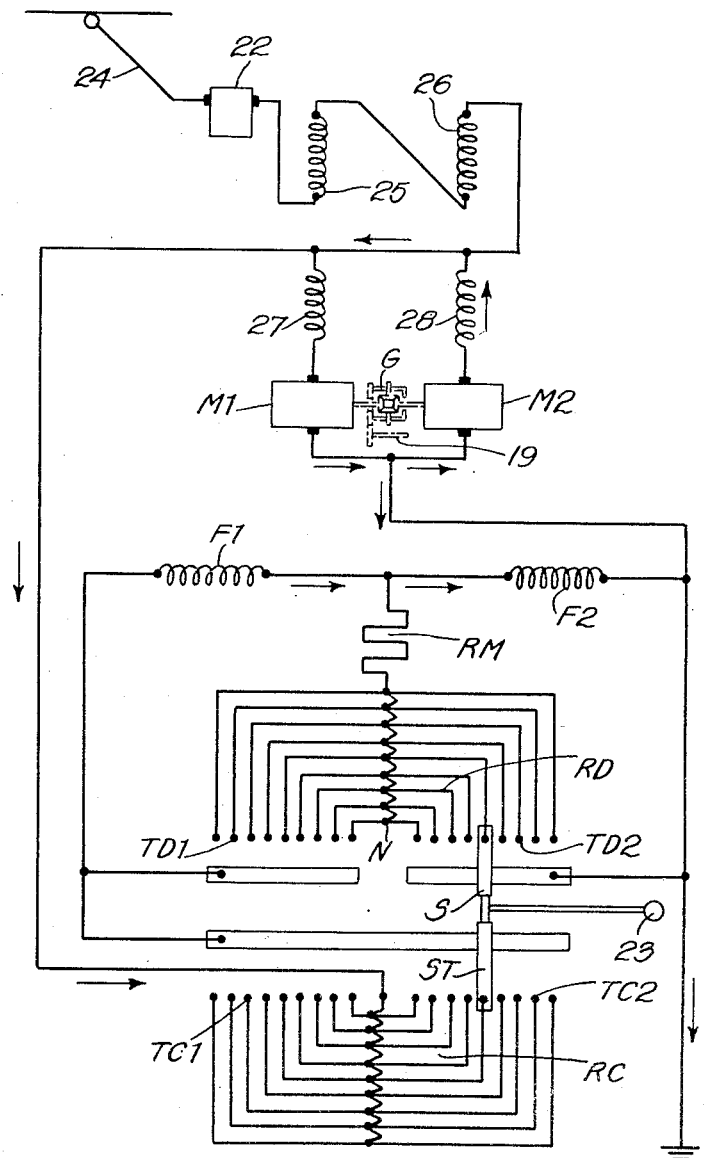

_United States Patent Office_

2,763,823
Patented Sept. 18, 1956

2,763,823

PLURAL ELECTRIC MOTOR VARIABLE SPEED DRIVE

Horace E. J. Symes, Johannesburg, Transvaal, Union of South Africa, assignor to New Consolidated Gold Fields Limited, Johannesburg, Transvaal, Union of South Africa Application July 14, 1952, Serial No. 298,670

Claims priority, application Union of South Africa July 14, 1951

19 Claims. (Cl. 318—8)

This invention relates to electrically driven vehicles, and especially to electric locomotives. Among the objects of the invention is that of improving the operating characteristics of vehicles of this kind, more particularly with regard to vehicles which are called on to undertake duties, such as shunting and train marshalling, which involve frequent stopping, starting and changes of direction. Other objects are to reduce power consumption, lessen maintenance costs and, in regard to mine locomotives, to minimise heat dissipation into underground workings.

A vehicle according to the invention is powered by two electric motors which are connected to the driving wheels through differential gearing, at least one, and preferably both, of the motors being of variable speed.

The motors run in opposite directions; and it will at once be appreciated that the control of the vehicle both as regards speed and direction is entirely dependent on the relative rotational speeds of the two motors.

At no time during operation of the vehicle need either motor be stopped and the driver's duty is confined to speeding up one of the motors relatively to the other of them. This continuous running of the motors results in several important advantages which are noted later in this specification.

Further according to the invention, the motors are non-series wound D. C. motors, i. e. they are either shunt- or compound-wound. A control circuit is provided that is used to vary the speed of one, or preferably both, of the motors. In the case of shunt-wound motors, the control circuit may comprise a control rheostat in series with the shunt field of the or each motor, or a diverter resistance across the shunt field, which resistance is desirably associated with a compensating resistance in series with it and with the shunt field or fields.

When the motors are compound wound, the motor field of one or both motors is varied by the use of a control circuit which may be similar to either one of the circuits indicated above for shunt wound motors and preferably that including a diverter resistance and compensating resistance.

The invention is illustrated in the drawings annexed hereto in which:

Figure 1 is an elevation partly in section of a drive according to the invention, Figure 2 is a circuit diagram of a drive using shunt-wound motors, Figures 3a, 3b, 3c are circuit diagrams of drives using compound wound motors and Figure 4 is the preferred circuit diagram of a drive using compound wound motors.

In Figure 1, the two motors are numbered M1 and M2 respectively. Between them is arranged a conventional differential gearing G including a crown wheel 10 fast with a cage 11.

The shaft 12 from the motor M1 passes axially through the crown wheel 10 and enters the cage, where a bevel gear wheel 13 is mounted on it. Similarly, the shaft 14 of the motor M2 carries a bevel gearwheel 15 that is engaged with the bevel 13 through idler bevels 16, 17.

The crown wheel 10 meshes with a gearwheel 18 on a shaft 19 which drives the wheels of a vehicle.

The motors M1 and M2 are of variable speed and are arranged to rotate in opposite directions to control the direction of rotation and the rotational speed of the driving shaft 19. The behaviour of the vehicle to the wheels of which the shaft 19 transmits its drive is therefore entirely dependent on the difference in the speeds of the two motors. Therefore no control means for the vehicle is necessary other than a means to vary the speed of each of the motors, or of one of them.

Thus, if both motors are running at the same speed, the shaft 19, and hence the vehicle will be stationary, while speeding up of one motor relatively to the other will cause the vehicle to move off in one or the other direction as the case may be.

The speed of each motor may be independently varied by an appropriate control means; or both may be simultaneously controlled.

In Figure 2 there is shown the main circuit for both motors M1, M2 and the control system for the motors.

The two shunt field coils F1 and F2 of the motors M1, M2 respectively, which are here assumed to be of the same type and rating, are associated with a diverter resistance RD, which can be inserted across either of the shunt fields F1, F2 by means of a control lever 23 operating a slider S arranged to move across either of two series of taps TD1, TD2 from the resistance RD. In this arrangement the shunt fields F1, F2 of the motors are connected in series across the supply and a controllable portion of diverter resistance RD is shunted across either one of the fields. Thus during the travel of the slider S across the series of taps TD1 a decreasing proportion of the diverter resistance is shunted across field F1 to weaken the latter and increase the motor speed whereby the vehicle will move in one direction, and during the travel of the slider across the series of taps TD2 resistance is shunted across field F2 to weaken the latter and increase the speed of motor M2, whereby the vehicle will move in the opposite direction. In the neutral position indicated by N the motor speeds are equal and opposite and the vehicle will be stationary.

A fixed minimum resistance RM is connected in series with the diverter resistance RD to ensure a positive minimum ohmic value for the circuit and to avoid short circuiting the fields F1 or F2 when the slider is in either one of the end positions.

The circuit described is shown as associated with a second circuit comprising a compensating resistance RC with two series of taps TC1 and TC2. The slider S has a tail ST which moves across thhe taps TC1 and TC2.

The compensating resistance RC is provided to maintain the over-all resistance of the circuit as a whole at a fixed value. This is necessary because for maximum tractive effort at starting of the vehicle the uncontrolled motor must be run at its maximum excitation whilst the over-all resistance of the excitation circuit must be maintained. The compensating resistance RC is in series with the two shunt windings F1 and F2 and with the diverter resistance RD, and is connected in inverse relation to resistance RD, so that resistance RC adds resistance or subtracts resistance from the circuit to the same extent as the total resistance of the shunt fields and the diverter resistance is reduced or increased as the slider moves across the taps TD1 and TD2, and itself plays no direct part in the speed control of the motors, whilst ensuring that at idling both motors run at their maximum designed shunt excitation.

Thus, during normal running, the diverter resistance RD is in parallel with either of the shunt windings F1 or F2. In the position illustrated RD is in parallel with F2 and the motor M2 is thus the faster running motor. The motor M1 runs at constant speed regardless of the position of the slide 3 on taps TD2 as the resistance RC keeps the current flowing in shunt winding F1 constant.

Two conditions of regenerative braking may be distinguished. In the first condition the slide S is at a position representing a definite speed and the wheels of the vehicle tend to overrun the speed (e. g. on a steep gradient). In the second condition the slide S is moved deliberately towards the position N to decrease the wheel speed.

Assuming that true regenerative conditions exist, i. e. that the source of current is such as to accept current that may be generated by the motors, in both cases there will be a feed back of current to the line from the armatures M1 and M2 and under the first condition this energy output will tend to brake the machine to the speed represented by the slide S while under the second condition the speed will be reduced to that represented by the new setting. In field trials it has been found possible to move the slide S from the outer point on taps TD2 to the outer position on taps TD1 without any untoward results, the machine reducing speed to a standstill and instantaneously starting up into the reverse direction and reaching top speed in a very short period of time.

The machine of Figure 2 is also suitable for dynamic braking conditions. Here also two situations have to be distinguished. The first situation is that in which the power supply source is such as not to accept current generated by the machine and the second is that where the current supply has been cut off e. g. by the current collector coming off the overhead supply line. Although the first situation was not contemplated when the invention was made, it has been found that with normal design practice, current generated by the faster machine under the first dynamic braking situation is dissipated in the armatures (shunt and field circuits of machines M1 and M2).

In a typical design, where the total installed machine capacity is approximately two and a half times the maximum continuous tractive vehicle rating, it has been found that the normal electro-thermal and mechanical dissipating capacity of the drive is sufficient to ensure continuous braking without overheating.

Thus the tests described above (moving the slide S between its extreme positions) as well as normal continuous braking were repeated under the first dynamic condition the same results were obtained as for true regenerative braking. In fact experienced operators could not distinguish between the effects of regenerative and dynamic braking. The difference was only recorded on the measuring instruments installed on the trial machine. It follows that in the second dynamic braking situation, current generated may be safely dissipated in the same manner. This has also been borne out in practice.

The use of shunt-wound motors may not be entirely satisfactory under certain operating conditions, because of two inherent characteristics. The first is that the vehicle will tend to run at constant speed at any position of the control lever 23, despite variation in torque. The second is the possibility of overloading the motors by increase of torque to a point where wheel slip becomes excessive, or the motor may even burn out. The operating conditions may be such that severe overload can never occur, and the characteristic of constant speed is a desirable feature. However, if these conditions are likely not to apply, considerable benefits will result from the use of compound wound motors.

The possible systems of compounding may be divided into three groups, viz (a) Each motor self compounded in the sense that each motor is compounded by its own armature current.

(b) Each motor cross-compounded with armature current from the other, and (c) Each machine compounded by line current.

These three arrangements are diagrammatically illustrated in Figures 3a, 3c and 3b respectively, the shunt fields and the control circuits being omitted. Because each of these arrangements used alone in some situations may have undesirable features, a combination of the arrangements of Figures 3a and 3b, in which these undesirable features are absent, is illustrated in Figure 4. In that figure current from the collector 24 is passed through line current compounding coils 25 and 26, in series with one another, before being split and fed into the armature circuits of the motors M1, M2 respectively through the self-compounding windings 27 and 28. The coils 25, 26 can, however, be in parallel with one another provided that the magnetising characteristics of the coils are equated.

The main current circuit shown in Figure 4 is controlled by a control circuit which is the same as that of Figure 2.

In all embodiments of the invention, once tractive effort is developed, the faster running machine operates as a motor while the slower machine is overrun by the planetary elements of the differential gearing, and acts as a generator. In the arrangement of Figure 4, the machines when acting as motors are cumulatively compounded, and when acting as generators are differentially compounded by the coils 27, 28 respectively. Thus, with increase of tractive effort the motor speed is reduced while the generator speed increases, until a point is reached at which the two speeds become equal and the vehicle is stalled. The possibility of the motors being overloaded is thus eliminated entirely. In fact, after stalling, the motors can be left running while still developing the torque corresponding to the controller setting, e. g. with the control lever in full speed position, without damage.

It will be apparent that in a circuit comprising merely motors and self compound windings insufficient limitations would be imposed on the speed of the vehicle merely by its operating under regenerative conditions. In fact the speed will tend to rise excessively with increased braking effort. It is to avoid this and to restrain the maximum speed of the vehicle under braking conditions, the line compound coils 25, 26 are in series with the circuit 27, M1, M2, 28 as described above. The ampere-turns value of the line compound coils 25, 26 is designed to be such as to cause maximum cancellation of the total compounding of the faster machine at its top speed within the limits of surge stability, irrespective of whether it is motoring or generating. As to the slower machine, the effect is always to weaken its field under tractive conditions, which tends to level out the speeds of the machines towards stalling; while under braking conditions the speed of the slower machine is somewhat decreased but this effect is small because the field of the slower machine is at or near saturation.

It follows that there is a definite maximum speed of the vehicle under both motoring and regenerative conditions, resulting from the compounding.

The performance of the vehicle is not affected at very slow speeds by the addition of the line compounding coils as in these circumstances the vehicle draws virtually no power from the line, the current used for tractive effort being a circulating current in the circuit 27, M1, M2, 28. While it is not considered necessary to include any form of normal overload protection in the arrangement of Figure 4, nonetheless a circuit breaker or the like for fault protection is desirably included. Obviously for circuits including purely shunt-wound motors, normal precaution must be taken.

The vehicle of the invention has pronounced advantages relatively to the conventional electrically driven vehicles powered by series wound motors. Some of these advantages are present whether the motors are shunt or compound wound; others are peculiar to compound wound motors.

The advantages of the invention are briefly set out below:

1. Full regenerative braking is obtained for any retardation whereas in the conventional vehicle regenerative braking is effective only to about one quarter of the full speed without auxiliary apparatus. This advantage is inherent in the vehicle of the invention for the following reason:

During normal tractive conditions, the slower speed machine is overrun by the planetary elements of the differential gearing and operates as a generator feeding current back into the lines. But, during braking, the planetary elements of the differential gearing tend to overrun the shaft of the faster machine, and the torque of the latter is thus reversed while its direction of rotation remains unchanged. Accordingly the machine commences to run as a high speed generator. At the same time, the torque of the slower machine is also reversed, and it commences to run as a motor. As the torque of the two machines is always equal, the power of the two machines will be proportional to their speeds. Thus, the power of the high speed machine will be greater than that of the slow speed machine, resulting in fully regenerative braking to standstill, with return of power to the transmission line.

This condition holds for vehicle speed reduction until the machines are running at equal speeds, i. e. regenerative braking is available in the vehicle right down to standstill.

Furthermore, emergency braking power is always on tap merely by operating the single control means abruptly.

The regenerative braking possible to standstill with a mechanical brake only for emergencies and parking saves continual replacement of brake shoes, blocks etc., and completely eliminates the nuisance of block dust.

2. During the entire operation of the vehicle, i. e. after the motors have been started, no heavy current circuits are made or broken for control purposes. Hence, maintenance of contacts will be eliminated. Also the currents flowing in the control circuits are very small so that the life of the manual control means is indefinitely prolonged, and arcing minimised in the preferred embodiments.

3. The control of the vehicle is smooth because:

(a) A much larger number of steps is feasible than is possible with drum controllers.

(b) The large inductance of the shunt-windings prevents rapid changes of excitation so that the transition between adjacent steps is smooth.

(c) The presence of the compound windings tends to cancel out changes of excitation due to manipulation of the control lever, since the weakening of excitation of one machine ends to increase the circulating current in the circuit 27, M1, M2, 28 and thereby cancel out the change in ampere-turns produced by the manipulation of the control lever. The result is a smooth increase of speed transmitted to the vehicle.

4. Automatic acceleration from standstill can be obtained by the immediate setting of the control lever to the maximum (assuming the load to be insufficient to cause stalling).

5. Since the motors are continually running during operation of the vehicle, the possibility exists of directly coupling ventilator fans to one or both of them. The necessity of providing a separate blower unit is therefore avoided.

In addition, since the fans are unidirectional the fan design can be made highly efficient.

6. In so far as an underground mine locomotive is concerned, one of the inherent disadvantages of conventional locomotives is the large amount of heat dissipated into the mine by banks of resistances when the locomotive is running at low speed with heavy load. Since these resistances are not present in the locomotive of the invention, far less heat is dissipated into the mine. This advantage is of tremendous importance for the deep level mining. The advantage becomes more apparent as the speed of the locomotive decreases, which is just the opposite of what occurs with the conventional locomotive.

7. As regards the electrical supply:

(a) The conventional locomotive at starting and during acceleration exhibits in its line current/time graph a jagged series of peaks well above the normal running value of the current, before the current levels out to its running value. As a consequence of these high peak values, provision must be made in the design of the over-all installation for circuit breakers to cater for these peak currents, and for contacts to carry them. On the other hand, the circuit breakers must be set to trip due to an overload at the end of what may be a very long transmission line. These opposing factors considerably complicate the correlation of the transmission circuit with the circuit breaker settings.

With the vehicle of the invention the current time/graph exhibits a simple rising curve from zero to running level without peaks. It follows that the cross-sectional area of the conductors can be materially reduced relatively to present practice, and that the setting of the circuit breakers can be put lower than in existing practice, i. e. the circuit breakers can be set to look after the normal maximum running current of the vehicle and need not cater for peak tractive currents.

8. The compound windings can be so designed that stalling occurs before significant wheel slip takes place.

9. If required, the basic characteristics of the vehicle can be changed at the will of the driver. This could be done by bringing the compound windings to a switch on the driver's panel so that motor compounding may be cut in or out as desired to make the motors run as pure shunt or as compound wound units as previously described. For instance, it may be desirable to run on a compound characteristic when handling heavy loads and run on shunt with fast light loads or the locomotive may be transferred to another system where different characteristics will give better operating conditions. A large number of variations could be introduced in this way, including variation of the amount of compounding with an adjustable tapped diverter.

10. In speeds below the maximum the vehicle of the invention has a higher efficiency than the conventional electrically driven vehicle. At maximum speed the efficiency drops somewhat but this loss is easily outweighed by the other manifold advantages of the vehicle of the invention.

11. In the vehicle of the invention no grid resistances are required. In conventional vehicles these normally carry the full tractive current and are a notorious source of wastage of power on all notches except full speed and one or two intermediate economical running positions, where several motors are used with series-parallel control. An economical notch is assumed to be one on which there is no resistance in series with the motor armatures.

In the vehicle of the invention any and every speed from zero to maximum is economical, i. e. with the exception of the normal losses in the motors.

12. The H. P. rating of each machine must, of necessity, be somewhat higher than that actually required by the vehicle so that the maximum torque will be proportionally higher. Hence, the fact that the vehicle tends to be over-motored is by no means disadvantageous since this will result in a starting torque at least equal to and possibly higher than that of a series motor vehicle of the same output horse-power. This produces a greater possible acceleration and regenerative retardation, with increased scheduled speed.

13. Due to the feature that current drawn from the line at starting is zero, save for the current due to losses in the two motors, there is no volt drop in the system, so that full volts are always available at starting, whereas in conventional machines the drop may be very considerable.

14. The vehicle of the invention is capable of efficient operation when drawing current from an installation the resistance of which is, or has become, so high that the conventional vehicle is incapable of starting. This is so because the conventional vehicle requires a substantial peak current at starting, while the vehicle of the invention theoretically draws zero current from the line of starting.

15. The vehicle of the invention is materially unaffected by variation in the line voltage within reasonable limits where shunt or highly compounded motors are used.

Since the vehicle has maximum torque at starting it is very suitable for re-railing duty without the provision of specially rated resistances as would be required with series motors.

16. The locomotive of the invention may collect its current from an overhead line or from a third rail; or from batteries. In the last case regenerative braking would charge the battery and so greatly increase the amount of work obtainable from the battery for each charge.

I claim:

1. A traction system for an electrically driven vehicle, comprising two dynamo-electric machines, each machine having an armature circuit and a shunt-field winding across the armature circuit, the shunt-field windings of the machines being in series with one another; a variable diverter resistance adapted to be connected across the shunt-field windings in turn; a fixed minimum resistance in series with the diverter resistance; and differential gearing connecting the machines to the driving wheels of the vehicle.

2. The traction system claimed in claim 1 including a compensating resistance in series with the shunt-field circuit, the compensating resistance being variable simultaneously with and in opposite sense to the diverter resistance to keep the total shunt field circuit resistance constant.

3. The traction system claimed in claim 1 including compounding windings in the armature circuit.

4. The traction system claimed in claim 3 in which the compounding windings are self-compounded.

5. The traction system claimed in claim 3 in which the compounding windings are cross-compounded.

6. The traction system claimed in claim 3 in which the compounding windings are line-compounded.

7. The traction system claimed in claim 3 in which the compounding windings are composed of self-compounded and line-compounded elements.

8. The traction system claimed in claim 7 in which the compounding windings of each machine are so connected that the current through the assembly of line current compounding windings is divided between the armature circuits of the two machines through the self-compounding windings.

9. The traction system claimed in claim 8 in which the line-compounding windings of the two machines are in series with one another.

10. A traction system for an electrically driven vehicle comprising two dynamo-electric machines, each machine having an armature circuit, compounding windings in the armature circuit and a shunt-field winding across the armature circuit, the shunt-field windings of the machines being in series with one another; a variable diverter resistance adapted to be connected across the shunt-field windings in turn; a fixed minimum resistance in series with the diverter resistance; a compensating resistance in series with the shunt-field circuit, the compensating resistance being variable simultaneously with and in opposite sense to the diverter resistance to keep the total shunt-field circuit resistance constant; and differential gearing connecting the machine to the driving wheels of the vehicles.

11. The traction system claimed in claim 10 in which the compounding windings consist in an assembly of line current compounding windings and self compounding windings so connected that the current through the assembly of line current compounding windings is divided between the armature circuits of the two machines through the self-compounding windings.

12. The traction system claimed in claim 11 in which the line-compounding windings of the two machines are in series with one another.

13. A traction system for an electrically driven vehicle, comprising two D. C. dynamo-electric machines, each machine having an armature circuit and a shunt-field winding across the armature circuit, the shunt-field windings of the machines being in series with one another, a variable diverter resistance adapted to be connected across the shunt-field windings in turn, means to maintain a predetermined minimum field excitation in the machine across the shunt-field winding of which the diverter resistance is shunted, and differential gearing connecting the motors to the driving wheels of the vehicle.

14. The traction system claimed in claim 13 in which the means to maintain a minimum field excitation is a fixed minimum resistance in series with the diverter resistance.

15. The traction system claimed in claim 13 in which the means to maintain a minimum field excitation is an undiverted field winding in each machine.

16. The traction system claimed in claim 15 in which the undiverted field winding is a compounding winding.

17. A traction system for an electrically driven vehicle comprising two D. C. dynamo-electric machines, each machine having an armature circuit, compounding field windings connected to the armature circuit and a shunt-field winding across the armature circuit, the shunt-field windings of the machines being in series with one another, a variable diverter resistance adapted to be connected across the shunt-field windings in turn, and differential gearing connecting the machines to the driving wheels of the vehicle.

18. The traction system claimed in claim 17 in which the compounding windings consist in an assembly of line current compounding windings and self compounding windings so connected that the current through the assembly of line current compounding windings is divided between the armature circuits of the two machines through the self-compounding windings.

19. The traction system claimed in claim 18 in which the line-compounding windings of the two machines are in series with one another.

References Cited in the file of this patent

UNITED STATES PATENTS

| | | |
|---|---|---|
| 696,301 | Barnard | Mar. 25, 1902 |
| 942,198 | Dey | Dec. 7, 1909 |
| 1,077,725 | Kramer | Nov. 4, 1913 |
| 1,667,718 | Connell | May 1, 1928 |
| 1,744,223 | Hild | Jan. 21, 1930 |
| 2,578,015 | Reinhard | Dec. 11, 1951 |